(12) United States Patent
Masaki et al.

(10) Patent No.: US 7,835,551 B2
(45) Date of Patent: Nov. 16, 2010

(54) TELEVISION SET AND AUTHENTICATION DEVICE

(75) Inventors: Yasuo Masaki, Daito (JP); Hirono Tsubota, Daito (JP); Akinori Okazaki, Daito (JP); Sadanori Murakami, Daito (JP); Yukiyoshi Sasao, Daito (JP); Masahiro Takeshita, Daito (JP); Masao Kokado, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 940 days.

(21) Appl. No.: 11/708,656

(22) Filed: Feb. 20, 2007

(65) Prior Publication Data
US 2007/0201730 A1 Aug. 30, 2007

(30) Foreign Application Priority Data
Feb. 20, 2006 (JP) ............... 2006-042476

(51) Int. Cl.
*G06K 9/00* (2006.01)
(52) U.S. Cl. .................. 382/118; 340/5.2; 340/5.83; 348/14.16; 382/103; 382/154; 386/108; 386/117
(58) Field of Classification Search ............... 382/115, 382/118, 124, 220, 154, 103; 340/5.2, 5.83; 348/14.16; 386/108, 117
See application file for complete search history.

(56) References Cited

U.S. PATENT DOCUMENTS 6,137,526 A * 10/2000 Kakii .................. 348/14.16

| | | | |
|---|---|---|---|
| 6,608,914 B1 * | 8/2003 | Yamaguchi et al. ......... 382/118 |
| 6,697,505 B2 * | 2/2004 | Yamaguchi et al. ......... 382/118 |
| 7,149,549 B1 * | 12/2006 | Ortiz et al. ................... 455/566 |
| 7,650,057 B2 * | 1/2010 | Takeshita ..................... 386/46 |
| 7,693,308 B2 * | 4/2010 | Ono et al. .................... 382/118 |
| 2002/0063799 A1 * | 5/2002 | Ortiz et al. .................. 348/559 |

(Continued)

FOREIGN PATENT DOCUMENTS

JP  2001-216518  8/2001

(Continued)

OTHER PUBLICATIONS

Patent Abstracts of Japan, Publication No. 2004-259215, Publication Date Sep. 16, 2004 (1 page).

(Continued)

*Primary Examiner*—Gregory M Desire
(74) *Attorney, Agent, or Firm*—Osha • Liang LLP

(57) ABSTRACT

A television set allowing a small amount of information to be processed to authenticate at least a portion of a face with high precision, is configured as follows: The television set includes a memory, a camera and a CPU. The memory stores feature information in association with a position. The CPU detects the position of the facial portion of a person in an image. The CPU extracts feature information based on the image. The CPU collates the feature information extracted thereby with that of the feature information stored in the memory which corresponds to the position detected thereby. The CPU selects a channel corresponding to a result of the collation. The television set further includes a tuner and a display. The tuner extracts a broadcast signal of the channel selected by the CPU. The display displays a video image corresponding to the signal extracted by the tuner.

8 Claims, 6 Drawing Sheets

U.S. PATENT DOCUMENTS

| | | | |
|---|---|---|---|
| 2003/0108227 A1* | 6/2003 | Philomin et al. | 382/124 |
| 2004/0184077 A1* | 9/2004 | Umeda | 358/1.15 |
| 2004/0202353 A1* | 10/2004 | Doi et al. | 382/115 |
| 2006/0188234 A1* | 8/2006 | Takeshita | 386/107 |
| 2006/0280445 A1* | 12/2006 | Masaki et al. | 386/95 |
| 2010/0034432 A1* | 2/2010 | Ono et al. | 382/118 |

FOREIGN PATENT DOCUMENTS

| | | |
|---|---|---|
| JP | 2001-243466 | 9/2001 |
| JP | 2001-273505 | 10/2001 |
| JP | 2004-259215 | 9/2004 |

OTHER PUBLICATIONS

Patent Abstracts of Japan, Publication No. 2001-216518, Publication Date Aug. 10, 2001 (1 page).

Patent Abstracts of Japan, Publication No. 2001-273505, Publication Date Oct. 5, 2001 (1 page).

Patent Abstracts of Japan, Publication No. 2001-243466, Publication Date Sep. 7, 2001 (1 page).

* cited by examiner

TELEVISION SET AND AUTHENTICATION DEVICE

BACKGROUND OF THE INVENTION

1. Field of the Invention the present invention relates generally to television sets and authentication devices and particularly to television sets and authentication devices that conduct a search for and retrieve information for personal authentication.

2. Description of the Background Art

Japanese Patent Laying-open No. 2004-259215 discloses a face detection system detecting the face of a person in an image. The face detection system includes a unit obtaining an image, a unit detecting a degree of separation, a face orientation template storage unit, a right nose hole template storage unit, a left nose hole template storage unit, a right nose hole detection unit, a left nose hole detection unit, and a face detection unit. The unit obtaining an image obtains an image. The unit detecting a degree of separation extracts a candidate feature from the obtained image through a separation degree filter. The face orientation template storage unit stores a plurality of face orientation templates. The right and left nose hole template storage units store right and left nose hole templates, respectively. The right nose hole detection unit uses an extracted candidate feature and the stored right nose hole template to detect a right nose hole. The left nose hole detection unit uses an extracted candidate feature and the stored left nose hole template to detect a left nose hole. The face detection unit selects a face orientation template, as based on the right or left nose hole as detected, from the stored face orientation templates, and uses the selected face orientation template and the obtained image to detect a face.

The invention disclosed in Japanese Patent Laying-open No. 2004-259215 can provide a face detection system that is robust and capable of detecting the face of a person with high precision if the person varies his/her face in orientation rightward and leftward significantly, wears glasses, and/or the like.

Japanese Patent Laying-open No. 2001-216518 discloses a method which includes a facial contour and facial parts and matches a facial image including the face of a person with a plurality of facial templates representing faces different at least in type, orientation and in which direction a source of light illuminating the face is directed. A most closely matching facial template is determined, and in accordance therewith information is obtained on the orientation of a face in a facial area including the face in the facial image, and the direction of a source of light illuminating the face.

The invention disclosed in Japanese Patent Laying-open No. 2001-216518 allows a contrast of a face included in a facial image to be considered to obtain information for appropriately extracting a facial area.

Japanese Patent Laying-open No. 2001-273505 discloses a method of automatically classifying a digital image, including the steps of: analyzing an image including the face of a person; determining relative to a frame of an image the position of a face disposed; and classifying the image, as based on the position of the face relative to the frame of the image.

The invention disclosed in Japanese Patent Laying-open No. 2001-273505 allows an image to automatically be classified and editing to be done for obtaining an effect of emotion as desired.

Japanese Patent Laying-open No. 2001-243466 discloses a facial recognition device including an image input unit receiving image data which is in turn used to perform a facial recognition process. The facial recognition device includes a drive unit, a face orientation detection unit and a movement control unit. The drive unit moves at least one of the position and orientation of the image input unit relative to space. The face orientation detection unit use the image data to detect the orientation of a face in the image. The movement control unit controls the drive unit, as based on the orientation of the face as detected by the face orientation detection unit.

The invention disclosed in Japanese Patent Laying-open No. 2001-243466 can provide facial recognition with high precision without requiring a person to move and/or change his/her orientation, posture and/or the like, or awkwardness attributed to such movement.

However, the inventions as disclosed in Japanese Patent Laying-open Nos. 2004-259215 and 2001-216518 require to process a large amount of information to detect a face.

The invention as disclosed in Japanese Patent Laying-open No. 2001-273505 does not provide any consideration to detecting a face.

The invention as disclosed in Japanese Patent Laying-open No. 2001-243466 requires a drive unit for detecting a face. Accordingly it requires a device having a complicated structure.

SUMMARY OF THE INVENTION

The present invention has been made to overcome the above disadvantages and it contemplates a television set and authentication device that allows a small amount of information to be processed to authenticate at least a portion of a face with high precision.

To achieve this object, the present invention in one aspect provides a television set including a storage unit, an image shooting unit for shooting an image, and an authentication unit. The storage unit stores feature information of facial portions of a user in association with a plurality of positions of the facial portions in user's images shot by the image shooting unit, the positions being closer to a perimeter of an image than a center of the image, and the center of the image, respectively. The authentication unit uses the feature information stored in the storage unit to authenticate the facial portion of a person included in an image output from the image shooting unit. The authentication unit includes a detection unit, a extraction unit, a collation unit, and a select unit. The detection unit detects the position of the facial portion of the person in the image output from the image shooting unit. The extraction unit extracts from the image output from the image shooting unit the feature information of the facial portion of the person included in the image output from the image shooting unit. The collation unit performs a collation of the feature information extracted by the extraction unit against that of the feature information stored in the storage unit corresponding to the position detected by the detection unit. The select unit selects a channel corresponding to a result of the collation done by the collation unit The television set further includes a tuner and a display unit. The tuner extracts a broadcast signal received by an antenna that is a broadcast signal of the channel selected by the select unit. The display unit displays a video image corresponding to the signal extracted by the tuner.

The present invention in another aspect provides a television set including a storage unit, an image shooting unit for shooting an image, and an authentication unit. The storage unit stores feature information of facial portions of a user in association with positions of the facial portions in user's images shot by the image shooting unit. The authentication unit uses the feature information stored in the storage unit to authenticate the facial portion of the person included in an image output from the image shooting unit. The authentication unit includes a detection unit, a extraction unit, a collation unit, and a select unit. The detection unit detects the position of the facial portion of the person in the image output from the image shooting unit. The extraction unit extracts from the image output from the image shooting unit the feature information of the facial portion of the person included in the image output from the image shooting unit. The collation unit performs a collation of the feature information extracted by the extraction unit against that of the feature information stored in the storage unit corresponding to the position detected by the detection unit. The select unit selects a channel corresponding to a result of the collation done by the collation unit The television set further includes a tuner and a display unit. The tuner extracts a broadcast signal received by an antenna that is a broadcast signal of the channel selected by the select unit. The display unit displays a video image corresponding to the signal extracted by the tuner.

Furthermore, desirably the feature information stored in the storage unit is associated with each of more than one position each having a different distance from a center of the image.

Alternatively, desirably, more than one position each having the different distance from the center of the image include a plurality of positions closer to a perimeter of the image than the center of the image, and the center of the image.

Furthermore, desirably the authentication unit also includes a storage control unit controlling the storage unit to store the feature information extracted by the extraction unit in association with the position of the facial portion of the person in the image output from the image shooting unit.

Alternatively, desirably the display unit includes a unit for displaying a video image corresponding to the signal extracted by the tuner, and, in addition thereto, information indicating the position of the facial portion of the person. Together therewith, desirably the authentication unit further includes a display control unit and an image shooting control unit. The display control unit controls the display unit to display the information indicating the position of the facial portion of the person. The image shooting control unit controls the image shooting unit to shoot an image after the display unit displays the information indicating the position of the facial portion of the person in the image. Together therewith, desirably the storage control unit includes a unit for controlling the storage unit to store the feature information extracted by the extraction unit from the image shot by and output from the image shooting unit, as controlled by the image shooting control unit, in association with the position indicated by the information displayed by the display unit, as controlled by the display control unit.

Furthermore, desirably the extraction unit includes a unit for generating information indicating a distribution in color of the facial portion of the person as the feature information.

Furthermore, desirably the authentication unit has a determination unit, a collation unit for performing a prioritized collation, and a collation unit for performing a collation by position. The determination unit determines whether the feature information extracted by the extraction unit should be collated with prioritized collation information serving as a type of the feature information stored in the storage unit The collation unit for performing a prioritized collation performs a prioritized collation of the feature information extracted by the extraction unit against the prioritized collation information if the determination unit determines that the feature information extracted by the extraction unit should be collated with the prioritized collation information. The collation unit for performing a collation by position collates the feature information extracted by the extraction unit with that of the feature information different from the prioritized collation information which is associated with the position detected by the detection unit, if the determination unit determines that the feature information extracted by the extraction unit should be collated with the feature information different from the prioritized collation information.

The present invention in another aspect provides an authentication device including a storage unit, an image shooting unit for shooting an image, and an authentication unit. The storage unit stores feature information of facial portions of a user in association with positions of the facial portions in user's images shot by the image shooting unit. The authentication unit uses the feature information stored in the storage unit for authenticating the facial portion of the person included in an image output from the image shooting unit. The authentication unit includes a detection unit, an extraction unit, a collation unit, and a select unit. The detection unit detects a position of the facial portion of the person in the image output from the image shooting unit The extraction unit extracts from the image output from the image shooting unit the feature information of the facial portion of the person included in the image output from the image shooting unit. The collation unit performs a collation of the feature information extracted by the extraction unit against that of the feature information stored in the storage unit corresponding to the position detected by the detection unit. The select unit selects information indicating a result of the collation done by the collation unit. The authentication device further includes a result output unit. The result output unit outputs the information selected by the select unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe an embodiment of the present invention. In the following description, identical components are identically denoted. They are also identical in name and function. Accordingly they will not be described repeatedly in detail.

Figure 1:
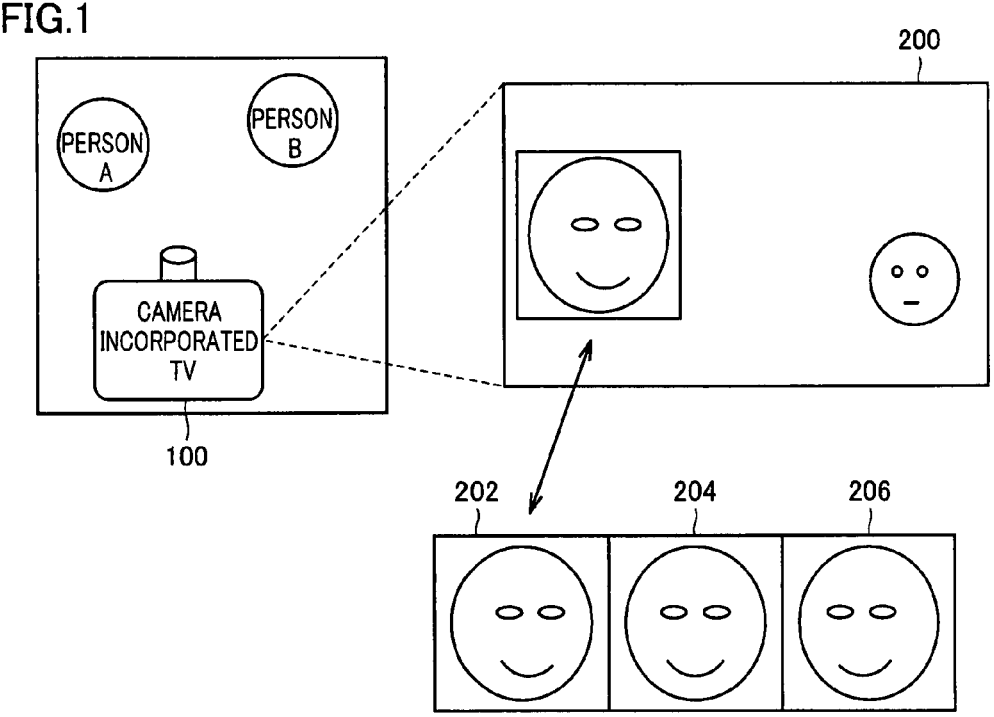
FIG. 1 represents a concept of a function of an authentication device in an embodiment of the present invention.

FIG. 1 represents a concept of a function of an authentication device in the present embodiment. The authentication device in the present embodiment authenticates the face of a user in an image 200 shot with a camera 150 described hereinafter. The authentication device in the present embodiment collates data of a facial portion of the user in image 200 with template data stored in a memory 152 described hereinafter to authenticate the user. To authenticate the user, the authentication device in the present embodiment selects template data for collation among template data 202, 204, 206 and the like, as based on the position of the facial portion in image 200.

Figure 2:
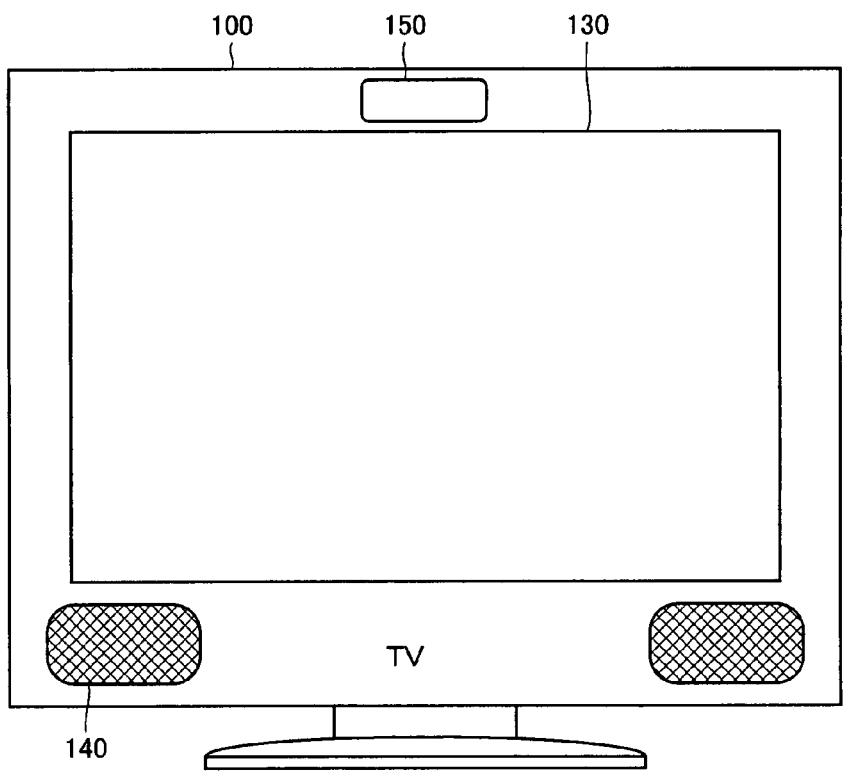
FIG. 2 is a front view of a television set in the embodiment of the present invention.

With reference to FIG. 2, the authentication device in the present embodiment is configured, as will be described hereinafter. The authentication device in the present embodiment is implemented as a television set 100 installed in a household. FIG. 2 is a front view of television set 100.

Television set 100 includes a display 130, a speaker 140, and camera 150. Speaker 140 is for example capable of outputting stereo sound. Speaker 140 may be disposed at a position other than shown in FIG. 2. For example, speaker 140 may be positioned at a side surface of the casing of television set 100. While in the present embodiment camera 150 is positioned at a front center of television set 100, camera 150 may be disposed at a different position.

Camera 150 shoots an object present within a shootable range. The object includes a viewer of television set 100 and the like.

Figure 3:
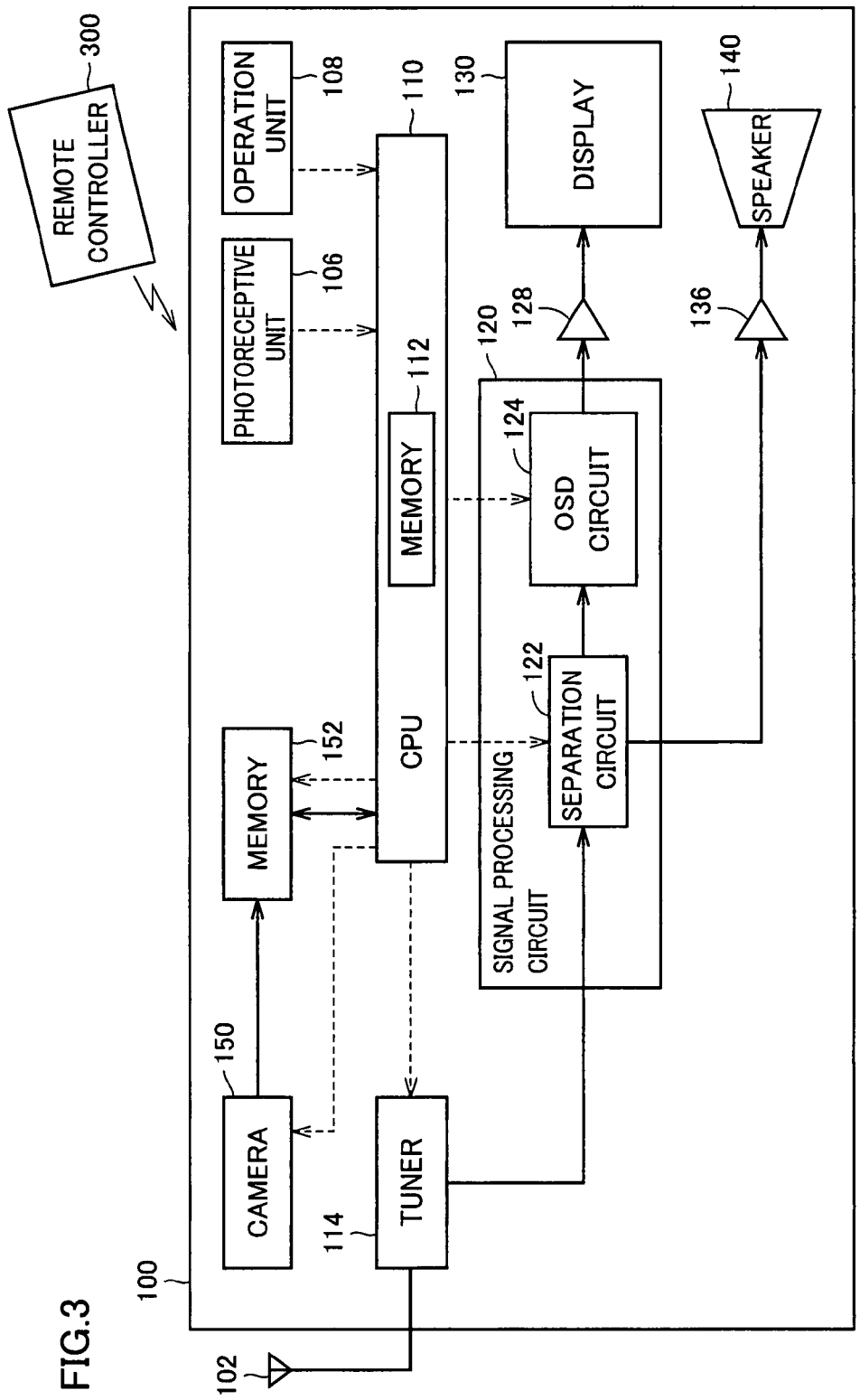
FIG. 3 is a block diagram showing a configuration of hardware of the television set in the embodiment of the present invention.

With reference to FIG. 3, television set 100 is configured, as will further be described hereinafter. FIG. 3 is a block diagram showing a configuration of hardware of television set 100.

Television set 100 includes the configuration shown in FIG. 2 plus an antenna 102 receiving a broadcast signal formed of a video signal and an audio signal, a tuner 114 connected to antenna 102 to extract a channel indicated by a user or a broadcast signal designated by a central processing unit (CPU) 110 described hereinafter, a photoreceptive unit 106 receiving a signal from a remote control terminal 300, an operation unit 108 receiving an input of an instruction issued to television set 100, and CPU 110 controlling how television set 100 should operate. CPU 110 includes a memory 112. Remote control terminal 300 emits infrared light for controlling how television set 100 should operate.

Television set 100 further includes a signal processing circuit 120 operative in response to a signal received from CPU 110 to separate a signal received from tuner 114 into a video signal and an audio signal and output the video and audio signals, a display 130 displaying a video image, and a driver 128 for outputting to display 130 the video signal output from signal processing circuit 120.

Signal processing circuit 120 includes a separation circuit 122 receiving a signal from tuner 114 and separating the signal into video and audio signals, and an on screen display (OSD) circuit 124 operative in response to a signal received from CPU 110 to generate an image displayed on display 130.

Television set 100 further includes an amplifier 136 receiving the audio signal from separation circuit 122 and operative in response to a signal received from CPU 110 to amplify and output the audio signal, and speaker 140 outputting sound as based on the audio signal output from amplifier 136.

Figure 4:
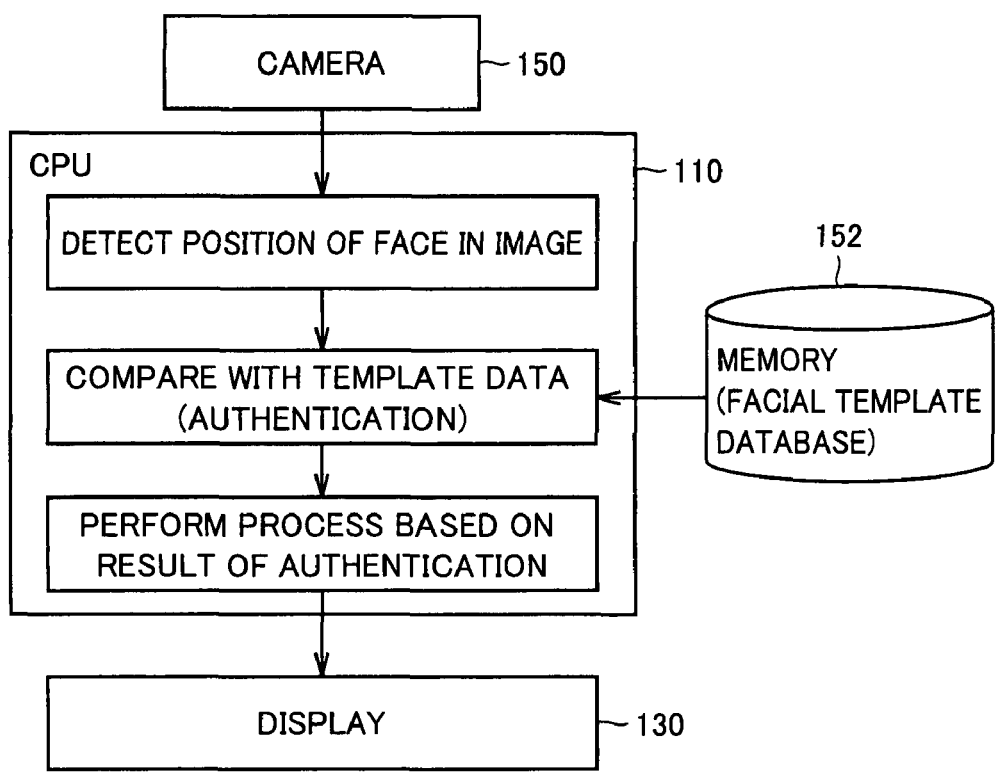
FIG. 4 illustrates a role of a component of the television set in the embodiment of the present invention.

FIG. 4 illustrates a role of a component of television set 100. Camera 150 shoots an image and thus generates and outputs image data to CPU 110. CPU 110 detects the position of a facial portion in the image data and collates it with template data stored in memory 152, and performs a process in accordance with a result of authentication. Display 130 outputs information in accordance with the process performed by CPU 110.

Television set 100 is controlled, as implemented by a device, a circuit and the like mounted in television set 100, and software executed by CPU 110. Typically, such software is stored in memory 152 and executed by CPU 110 described above. The aforementioned device, circuit and the like per se are typical device, circuit and the like. Accordingly the present invention's most essential portion is the software stored in memory 152. The computer per se operates as well-known. Accordingly it will not be described repeatedly in detail.

Figure 5:
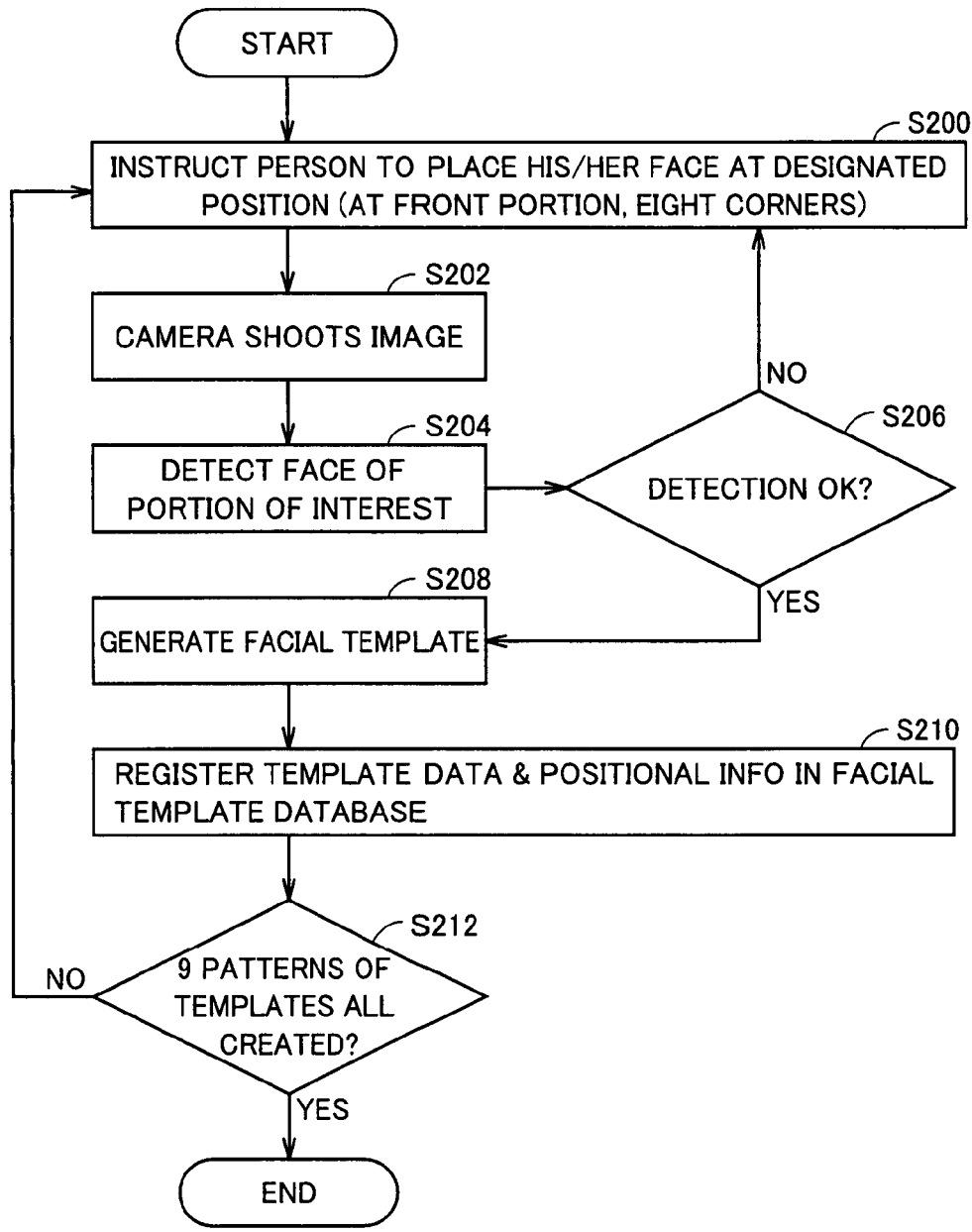
FIG. 5 is a flowchart of a procedure of controlling a process for registering template data in the embodiment of the present invention.

With reference to FIG. 5, television set 100 executes a program, which exerts such control as described hereinafter for registering the template data.

In step S200 CPU 110 outputs a signal to OSD circuit 124. When the signal is received, OSD circuit 124 generates a signal to display subsequent information. The information is information instructing a user to place his/her face at a designated position. In the present embodiment, the "designated position" is a center of an image displayed on display 130, four corners thereof, and a vicinity of a center of each side thereof. Display 130 having received the signal via driver 128 displays the information. Thus CPU 110, OSD circuit 124, driver 128 and display 130 cooperate to configure a virtual circuit designating for the user his/her facial position.

In step S202 CPU 110 transmits a signal instructing camera 150 to shoot an image. When he signal is received, camera 150 shoots the image. As the user is first instructed and camera 150 is then instructed to shoot the image, CPU 110 will control camera 150 to shoot a plurality of images including a facial portion positionally different from each other. Camera 150 having shot the image thus generates and outputs image data to memory 152. Memory 152 is controlled by CPU 110 to store image data shot by camera 150 in association with a position of the user as designated in step S200 by CPU 100 or the like.

In step S204 CPU 110 follows first, second and third steps as described hereinafter to detect the position of the facial portion in an image represented by image data stored in memory 152. To extract an image of the facial portion, as the first step CPU 110 converts data of that portion of the image data stored in memory 152 for which CPU 110 makes a decision on whether the data of the portion includes the image of the facial portion. This provides a reduced image of a portion to be determined. As the second step CPU 110 calculates a value representing a distribution in lightness of color of the portion in three horizontally adjacent regions. These three regions are positionally predetermined by a designer. In the present embodiment, as a value representing a distribution in lightness of color is calculated, CPU 110 calculates a mean value in lightness of pixels of each region. As the third step CPU 110 determines whether the distribution calculated in the second step satisfies a requirement. What requirement should be applied is not particularly limited. In the present embodiment is applied the requirement that the three horizontally adjacent regions have a center region having a mean value in lightness larger than those in lightness of the regions adjacent to the center region. This is based on the fact that normally a human facial image is low in lightness around the eyes and high in lightness around the nose. If the requirement is satisfied, memory 152 stores a coordinate of a center of each region. If the requirement is not satisfied, CPU 110 repeats the second and third steps for a region other than the above regions.

In step S206 CPU 110 determines whether the facial portion is detected in the image, as based on whether memory 152 has stored a coordinate in step S204. If so (YES in step S206) the control proceeds to step S208. Otherwise (NO in step S206) the control proceeds to step S200.

In step S208 CPU 110 generates template data based on the position of the facial portion detected thereby and the image data stored in memory 152. In the present embodiment "template data" indicates information that an image of a facial portion represents. What type of data should be handled as the template data is not particularly limited. In the present embodiment "template data" indicates a gradation of an image of a facial portion and a value representing a distance between the eyes thereof.

In step S210 CPU 110 correlates template data generated thereby with a position of the user designated in step S200 by CPU 110 or the like and thus store the template data in memory 152 at a facial template database. Thus memory 152 stores the template data in association with the position of the user designated in step S200 by CPU 110 or the like. As can be seen in FIG. 5, this process is repeated. Accordingly memory 152 will store template data for a plurality of images. In storing the template data, step S200 is effected. Accordingly, memory 152 will store template data in association with any of a plurality of positions closer to a perimeter of an image than a center of the image or the center of the image, respectively.

In step S212 CPU 110 refers to the facial template database stored in memory 152 to determine whether template data that should be generated have all been generated. In the present embodiment the template data that should be generated are template data for an image including a face at a center of the image, template data for an image including the face at a corner of the image, and template data for an image including the face around a center of a side of a perimeter of the image. In the present embodiment "template data for an image including a face at a corner of the image" is template data generated for each of four images including a face at each of four different corners, respectively. In the present embodiment "template data for an image including a face around a center of a side of a perimeter of the image" is template data generated for four images including a face around a center of each of different sides, respectively. If the template data have been generated (YES in step S212), the process ends. Otherwise (NO in step S212) the process proceeds to step S200.

Figure 6:
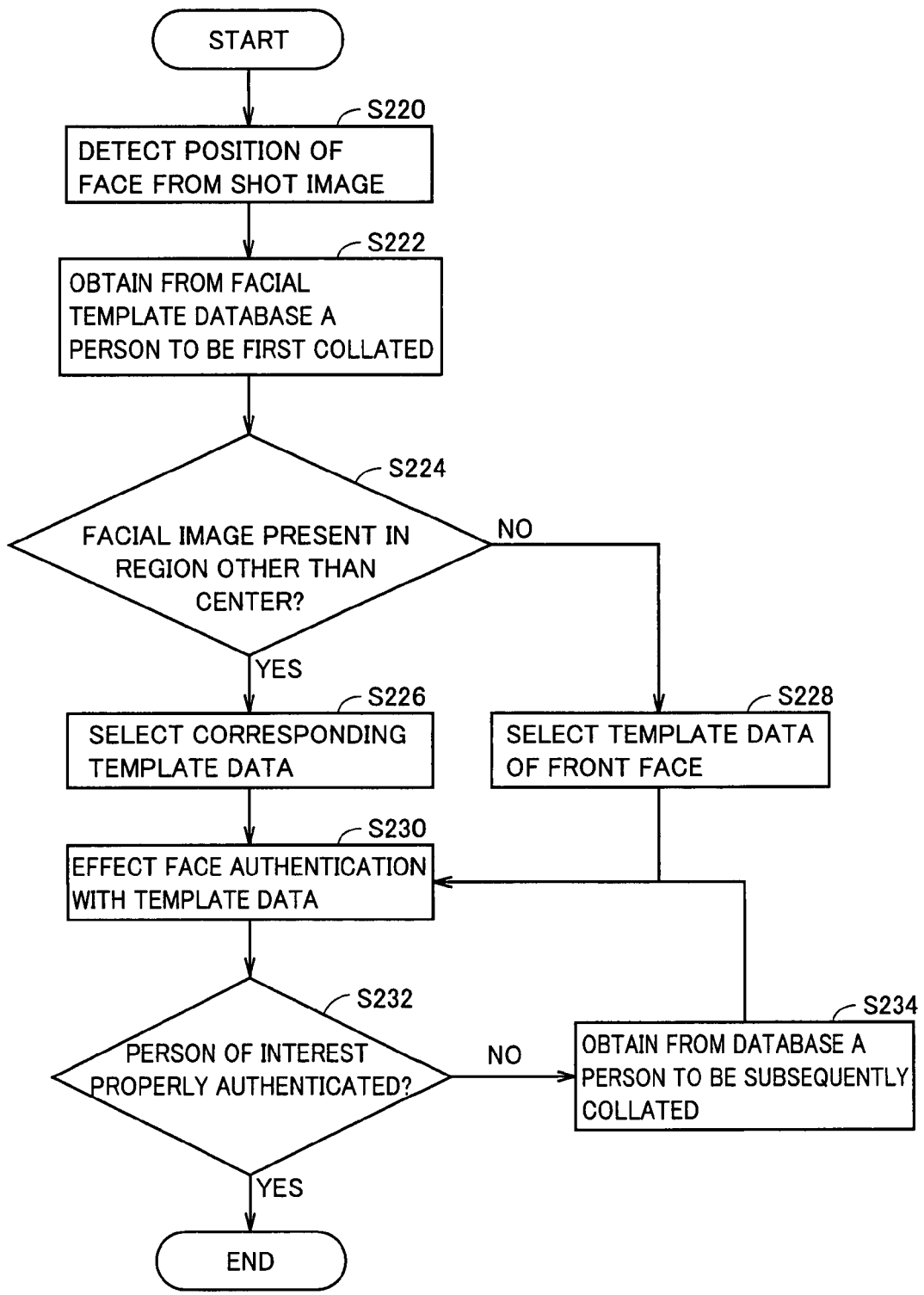
FIG. 6 is a flowchart of a procedure of controlling an authentication process of the television set in the embodiment of the present invention.

With reference to FIG. 6, television set 100 executes a program, which exerts such control as described hereinafter for authenticating a user.

In step S220 camera 150 shoots an image. CPU 110 causes memory 152 to store image data shot by camera 150 as it shoots the image. CPU 110 detects the user's facial position from the image data stored in memory 152. The facial position is detected through a step similar to step S204. Thus CPU 110 specifies from image data that camera 150 generates by shooting an image the position of the facial portion of the user in an image represented by the image data. When the facial position is detected, CPU 110 extracts information represented by the facial portion of the image, as based on the image data stored in memory 152. In the present embodiment, as the information represented by the image of the facial portion, CPU 110 extracts information representing a distribution in color of the image of the facial portion. In the present embodiment, as the information representing the distribution in color of the image of the facial portion, CPU 110 calculates a mean value in lightness of the pixels of a region expected to include a left eye and a mean value in lightness of the pixels of a region expected to include a right eye. In the present embodiment CPU 110 adds or subtracts a predetermined numerical value to or from the position of the facial portion that CPU 110 per se has specified to calculate an origin of the region expected to include the left eye and that of the region expected to include the right eye. The sizes of the regions expected to include the left and right eyes, respectively, are assumed to be previously stored in memory 152.

In step S222 CPU 110 obtains template data of a person who is first authenticated from the facial template database stored in memory 152.

In step S224 CPU 110 determines whether the facial portion in the image stored in memory 152 as the image data exists in the image at a region other than a center of the image. If so (YES in step S224) the control proceeds to step S226. Otherwise (NO in step S224) the control proceeds to step S228.

In step S226 CPU 110 reads template data corresponding to the position specified by CPU 110 per se. Thus CPU 110 selects, as based on the position specified in step S220 by CPU 110 per se, that of the plurality of template data stored in memory 152 which corresponds to the position specified in step S220 by CPU 110 per se.

In step S228 CPU 110 reads template data of a front face from memory 152. The "template data of a front face" indicates template data of a case with a face present in an image at a center. Thus CPU 110 selects, as based on the position specified in step S220 by CPU 110 per se, that of the plurality of template data stored in memory 152 which corresponds to the position specified in step S220 by CPU 110 per se.

In step S230 CPU 110 collates the information extracted in step S220 with the template data selected by CPU 110 per se to perform facial authentication. The facial authentication may be done in any method. In the present embodiment the facial authentication is done as based on the following two values: A first value is a coefficient of correlation of the information extracted in step S220 and representing the facial portion and the template data included in the facial template database. In the present embodiment CPU 110 in calculating the coefficient of correlation is assumed to previously filter the image data of the facial portion detected in step S220. A second value is a difference in gradient in gradation between the image data of the facial portion detected in step S220 and the template data included in the facial template database.

In step S232 CPU 110 determines from a result of authentication done thereby whether a person of whom camera 150 has shot an image is authenticated to be a person represented by the template data read from memory 152 (step S232). If so (YES in step S232) CPU 110 outputs a signal representative of a channel to tuner 14 as a signal indicating that the person of whom the camera shot the image has been authenticated to be the person represented by the template data read from the memory. The signal represents a channel corresponding to the authenticated user. Thus an interconnect connecting CPU 110 and tuner 114 outputs information representing a result of collation done by CPU 110. Tuner 114 receives the signal representing the channel and extracts a broadcast signal of the channel represented by the signal. Thus tuner 114 extracts that signal of the broadcast signal which corresponds to the result of the collation done by CPU 110. Display 130 displays a video image corresponding to the signal extracted by tuner 114. When the video image is displayed, the process ends. Otherwise (NO in step S232) the process proceeds to step S234.

In step S234 CPU 110 obtains template data of a person to be subsequently collated from the facial template database stored in memory 152.

In accordance with the configuration and flow chart described as above, television set 100 operates as will be described hereinafter.

CPU 110 instructs a user via display 130 to place his/her face at a designated position (step S200). After the instruction is issued, camera 150 shoots an image (step S202). Thus an image of the user's face is shot into the position designated by CPU 110.

After the image is shot, CPU 110 detects the position of the facial portion of the user (step S204). When the position is detected, CPU 110 determines whether the face has properly been detected (step S206). If so (YES in step S206), CPU 110 generates template data based on the position of the facial portion detected thereby and image data stored in memory 152 (step S208). When the template data is generated, CPU 110 correlates the template data generated thereby with the position designated thereby and thus registers the template data.

When the template data is registered, CPU 110 determines whether such data have been generated for all patterns (step S212). If not (NO in step S212) steps S200-S212 are repeated.

Thereafter if all template data are generated (YES in step S212) the generation of template data for one user completes. If the generation of the template data for one user completes, television set 100 generates template data for another user.

After template data are generated for all of the members of a family of a household having television set 100 installed therein, camera 150 shoots an image. As camera 150 shoots the image, image data is generated and therefrom CPU 110 detects the position of a facial portion (step S220). If the position is detected, CPU 110 obtains template data of a person to be first collated from the facial template database stored in memory 152 (step S222).

Figure 7:
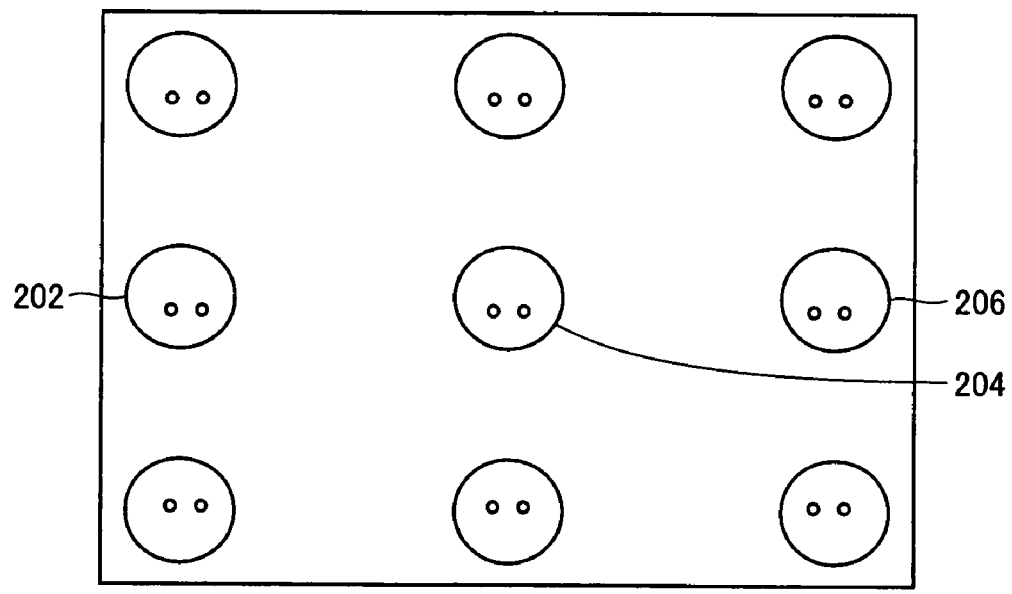
FIG. 7 is a diagram representing a relationship between template data and a facial portion in the embodiment of the present invention.

FIG. 7 represents a relationship between template data and a position of a facial portion. Typically when a user watches TV 100 the user looks at display 130. Accordingly, the user's line of vision is directed to a center of an image.

When the template data is obtained, CPU 110 determines whether the facial portion in the image is located in the image at a region other than a center of the image (step S224). If in FIG. 7 the facial portion is located at a lower left portion (YES in step S224), CPU 110 selects from the facial template database stored in memory 152 template data 222 corresponding to that position (step S226). When template data 222 is selected, CPU 110 collates the information extracted in step S220 with the template data selected by CPU 110 per se to perform authentication (step S230). When the authentication is done, CPU 110 determines whether the person the image of whom camera 150 has shot matches the person represented by template data 222 (step S232). If not (NO in step 232) CPU 110 obtains from the facial template database the template data of a person to be subsequently collated (step S234).

Thus the present embodiment provides a television set previously storing template data for a face that correspond to a plurality of coordinates, respectively, in an image, and the present invention provides an authentication device employing data based on a facial image detected in authentication and the previously stored template data to effect authentication.

Normally when a camera with a wide-angle lens is employed to shoot an image, the image exhibits such features as follows: As a first feature, the image has a distorted perimeter. As a second feature, the image has a front portion and a peripheral portion illuminated in different conditions. As a third feature, an image including a face at a center and an image including the face at a peripheral portion are different in in which direction the face looking at the camera is directed. To cover these features the television set in the present embodiment previously stores template data of a face located in an image at a center and that of the face located in the image at a perimeter.

The television set in the present embodiment effects authentication using template data corresponding to a position at which a face is detected. For example for a face located in an image at a left end relative to a center, template data for the face that is directed leftward is employed. Authentication using template data corresponding to a coordinate at which a face is detected provides an improved authentication rate. This effect is obtained for the first, second and third grounds as described hereinafter.

The first ground is that if a short image includes a face located at a perimeter of the image, template data having the image's distortion incorporated therein is employed to effect authentication.

The second ground is that how different conditions an image has a front portion and a peripheral portion illuminated in is incorporated in templates. The authentication device in the present embodiment is a television set equipped with a camera. A television set is often stationarily installed for use. The television set in the present embodiment generates template data while the television set is stationarily installed. Thus in generating a template how different conditions an image has a front portion and a peripheral portion illuminated in is incorporated in the template. Thus, as has been described above, how different conditions an image has a front portion and a peripheral portion illuminated in is incorporated in a template.

The third ground is that in authenticating a face, the orientation of the face significantly affects precision. This effect is not affected by the camera's resolution, an algorithm employed to recognize the face, or the like.

The television set in the present embodiment in selecting template data can readily select appropriate template data. Normally when a person watches TV, the person directs his/her face toward the TV's display. The television set in the present embodiment is equipped with a camera. Accordingly, the person watching TV will direct his/her face toward the camera. As the person watching TV has his/her face directed toward the camera, the position of the face in an image shot with the camera will correspond to the orientation of the face. As the face's position corresponds to the face's orientation, the television set in the present embodiment can detect the former to appropriately detect the latter. This is a ground for the television set of the present embodiment being capable of readily selecting appropriate template data. Thus the television set of the present embodiment can simplify an information process for authentication more significantly than a conventional authentication device.

As a result the television set of the present embodiment allows a small amount of information to be processed to authenticate at least a portion of a face with high precision. The television set of the present embodiment that allows a small amount of information to be processed to authenticate at least a portion of a face with high precision can implement rapidly and precisely an operation accommodating a user watching TV.

The present embodiment in a first exemplary variation provides an authentication device that may be implemented as a camera, rather than a television set.

Furthermore the present embodiment in a second exemplary variation provides an authentication device including an OSD circuit that may generate information in step S200 to instruct a user to place his/her face at a plurality of positions located in a helix relative to a center of an image displayed on display 130. Accordingly, memory will store template data that an image of a facial portion represents in association with each of a plurality of positions having different distances from the center of the image displayed on display 130.

Furthermore the present embodiment in a third exemplary variation provides an authentication device including a CPU that may determine the position of the facial portion of a user other than human. In that case the CPU does not employ the requirement employed to make a decision in step S204 and instead employs a requirement suitable for a user to be specified.

Furthermore the present embodiment in the third exemplary variation provides the authentication device such that CPU 110 may perform a process implemented by a logic circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television set comprising:
   an image shooting unit for shooting an image;
   a storage unit for previously storing first feature information of first facial portions of a user in association with respective positions of said first facial portions in user's images shot by said image shooting unit;
   an authentication unit using said first feature information stored in said storage unit for authenticating a second facial portion of a person included in an image output from said image shooting unit, said authentication unit including:
   a detection unit for detecting a position of said second facial portion in said image output from said image shooting unit,
   an extraction unit for extracting second feature information of said second facial portions from said image output from said image shooting unit,
   a collation unit for determining whether said second feature information corresponds to said first feature information in association with said position detected by said detection unit, and
   a select unit for selecting a channel corresponding to a result of the determination done by said collation unit;
   a tuner extracting a broadcast signal received by an antenna that is a broadcast signal of said channel selected by said select unit; and
   a display unit for displaying a video image corresponding to said signal extracted by said tuner.

2. The television set according to claim 1, wherein each of said positions has a different distance from a center of said image.

3. The television set according to claim 2, wherein said positions include:
   a plurality of positions closer to a perimeter of said image than said center of said image, and
   said center of said image.

4. The television set according to claim 1, wherein said authentication unit further includes a storage control unit for controlling said storage unit to store said second feature information extracted by said extraction unit in association with said positions of said second facial portions of said persons in said images output from said image shooting unit.

5. The television set according to claim 4, wherein:
   said display unit includes:
   a unit for displaying a video image corresponding to said signal extracted by said tuner and information indicating said position of said first facial portion of said user;
   said authentication unit further includes:
   a display control unit for controlling said display unit to display said information indicating said position of said second facial portion of said person, and
   an image shooting control unit for controlling said image shooting unit to shoot an image after said display unit displays said information indicating said position of said second facial portion of said person in said image; and
   said storage control unit includes a unit for controlling said storage unit to store said second feature information extracted by said extraction unit from said image shot by and output from said image shooting unit, as controlled by said image shooting control unit, in association with said position indicated by said information displayed by said display unit, as controlled by said display control unit.

6. The television set according to claim 1, wherein said extraction unit includes a unit for extracting information indicating a distribution in color of said second facial portion of said person as said second feature information.

7. The television set according to claim 1, wherein said authentication unit further includes:
   a determination unit for determining whether said second feature information extracted by said extraction unit should be collated with first prioritized collation information which is a piece of said first feature information stored in said storage unit;
   a first collation unit for determining whether said second feature information corresponds to said first prioritized collation information if said determination unit determines that said second feature information should be collated with said first prioritized collation information; and
   a second collation unit for performing a collation by position, collating said second feature information extracted by said extraction unit with that of said first feature information different from said prioritized collation information which is associated with said position detected by said detection unit, if said determination unit determines that said second feature information extracted by said extraction unit should be collated with said first feature information different from said prioritized collation information.

8. An authentication device comprising:
   an image shooting unit for shooting an image;
   a storage unit for previously storing first feature information of first facial portions of a user in association with respective positions of said first facial portions in user's images shot by said image shooting unit;
   an authentication unit using said first feature information stored in said storage unit for authenticating a second facial portion of a person included in an image output from said image shooting unit, said authentication unit including:
   a detection unit for detecting a position of said second facial portion in said image output from said image shooting unit, an extraction unit for extracting said second feature information of said second facial portions from said image output from said image shooting unit, a collation unit for determining whether said second feature information corresponds to said first feature information in association with said position detected by said detection unit, and a select unit for selecting a channel corresponding to a result of the determination done by said collation unit; and a result output unit for outputting said information selected by said select unit.

* * * * *